No. 718,699. PATENTED JAN. 20, 1903.
W. O. CRAIN & G. W. GWINN.
CLOTH PILER.
APPLICATION FILED APR. 8, 1902.

NO MODEL. 3 SHEETS—SHEET 1.

WITNESSES
S. Gordon Hopkins
Wm. I. Henry

INVENTORS
William Oliver Crain
George Wilbur Gwinn
BY
William Wesley Varney ATTORNEY No. 718,699. PATENTED JAN. 20, 1903.
W. O. CRAIN & G. W. GWINN.
CLOTH PILER.
APPLICATION FILED APR. 8, 1902.
NO MODEL. 3 SHEETS—SHEET 2.

WITNESSES
S. Gordon Hopkins
W. T. Henry

INVENTORS
William Oliver Crain
George Wilbur Gwinn
BY
William Wesley Varney ATTORNEY No. 718,699. PATENTED JAN. 20, 1903.
W. O. CRAIN & G. W. GWINN.
CLOTH PILER.
APPLICATION FILED APR. 8, 1902.
NO MODEL. 3 SHEETS—SHEET 3.

WITNESSES
S. Gordon Hopkins
W. J. Henry

INVENTORS
William Oliver Crain
George Wilbur Gwinn
BY
William Wesley Varney ATTORNEY

UNITED STATES PATENT OFFICE.

WILLIAM OLIVER CRAIN AND GEORGE WILBUR GWINN, OF BALTIMORE, MARYLAND, ASSIGNORS TO EDWARD ALEXANDER GRIFFITH, OF BALTIMORE, MARYLAND.

CLOTH-PILER.

SPECIFICATION forming part of Letters Patent No. 718,699, dated January 20, 1903.

Application filed April 8, 1902. Serial No. 101,926. (No model.)

*To all whom it may concern:*

Be it known that we, WILLIAM OLIVER CRAIN and GEORGE WILBUR GWINN, citizens of the United States, residing in Baltimore, in the State of Maryland, have invented a new and useful Machine for Spreading Cloth, of which the following is a specification.

Our invention relates to a cloth-spreading apparatus; and the objects of our invention are, first, to provide mechanical means for spreading cloth to be cut into patterns, and, second, to provide means whereby cloth to be cut into patterns may be spread more rapidly and evenly than can now be done by hand. We attain these objects by the mechanism illustrated in the accompanying drawings, in which—

Figure 1:
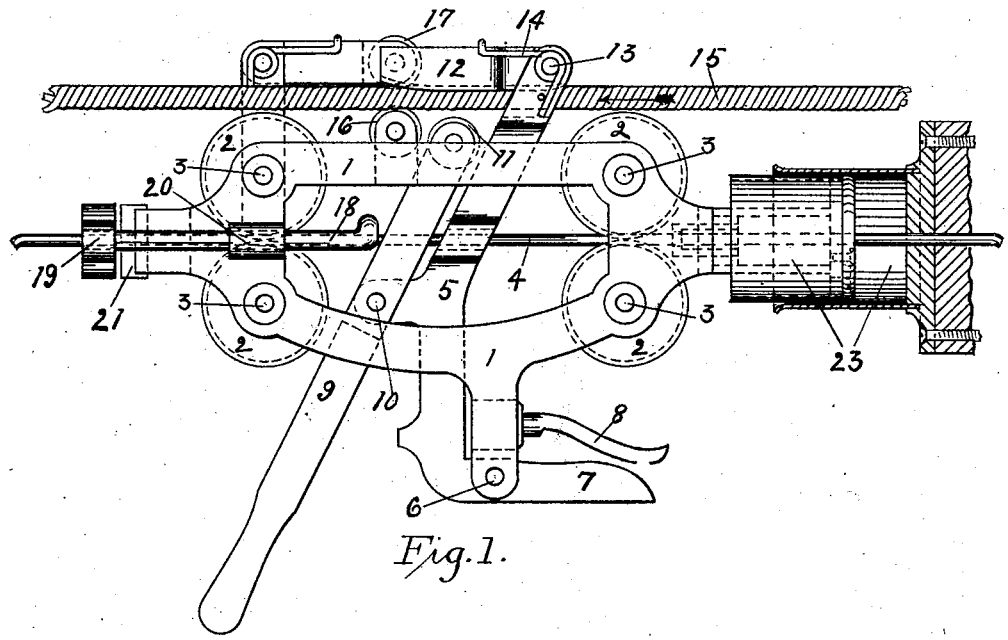
Figure 2:
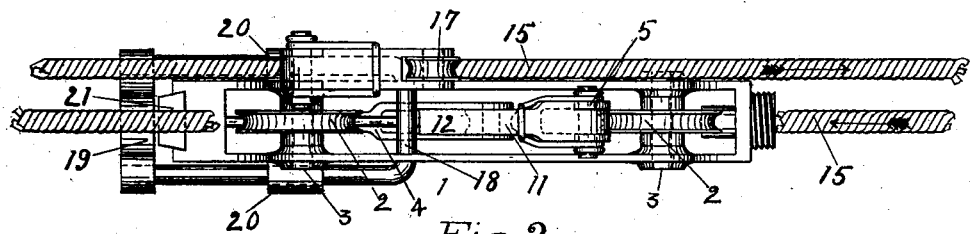
Figure 3:
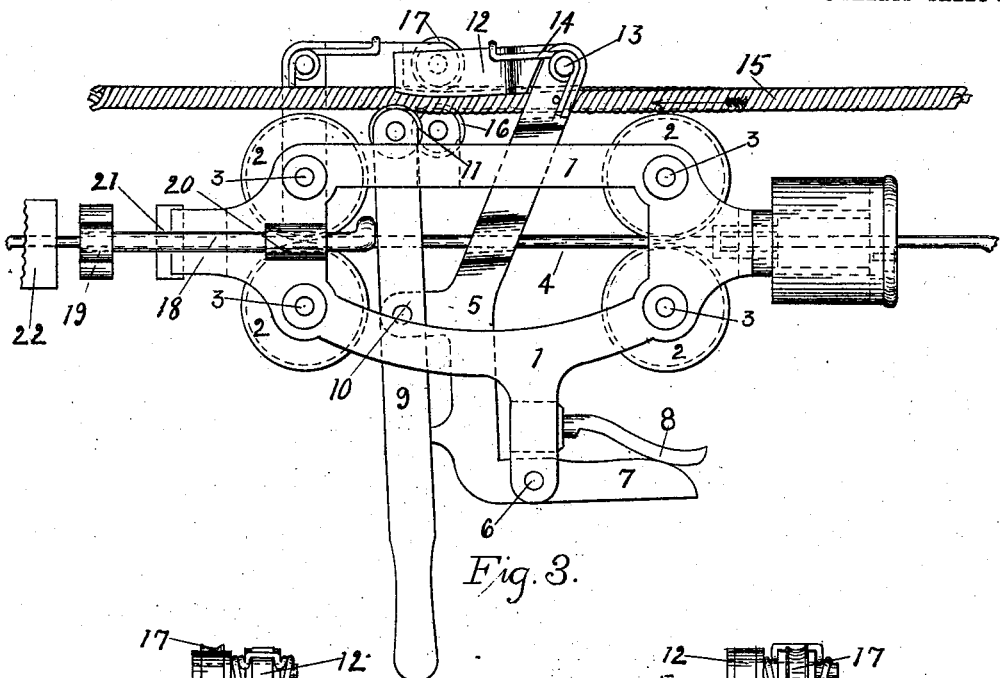
Figure 4:
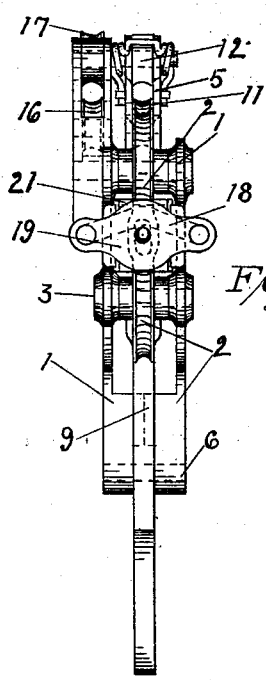
Figure 5:
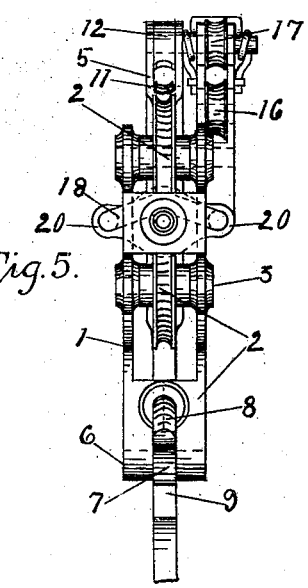
Figure 6:
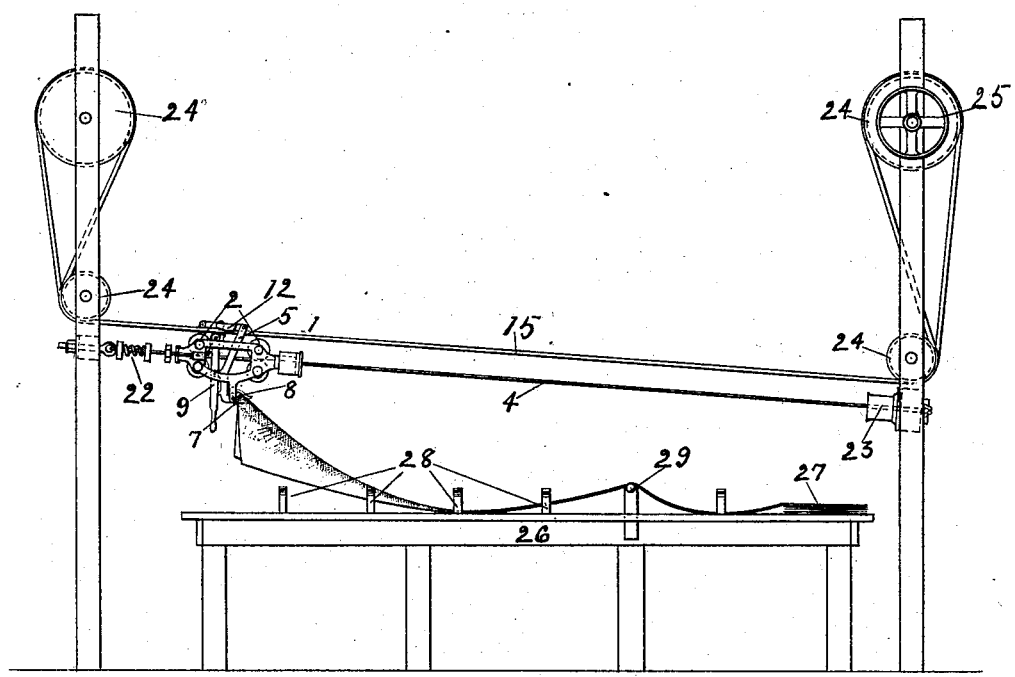
Figure 7:
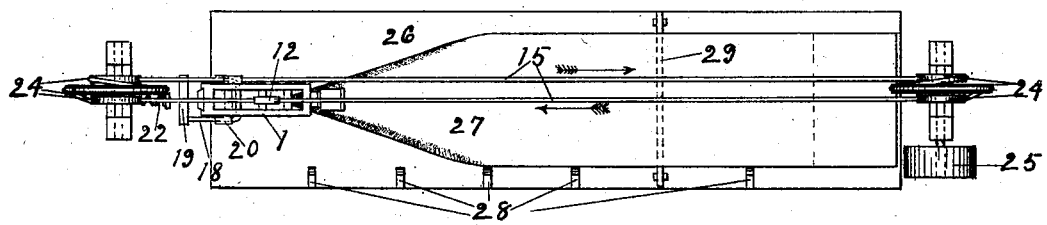

Figure 1 is a side view in elevation of our invention, showing the same open ready to receive the cloth. Fig. 2 is a plan view of the spreader shown in Fig. 1. Fig. 3 is a side view in elevation of our invention, showing the same closed. Fig. 4 is the forward end view of the spreader in position shown in Fig. 3. Fig. 5 is the rear end view of the spreader in position shown in Fig. 3. Fig. 6 is a view in elevation of the table supporting the cloth, the spreader in operation, and the operating mechanism; and Fig. 7 is a plan view of parts shown in Fig. 6.

Similar numerals refer to similar parts throughout the several views.

1 is the frame.

2 represents wheels journaled at 3 in frame 1 and having their peripheries grooved to receive wire-cable track 4.

5 is a lever fulcrumed at 6. The lower end of lever 5 is extended beyond fulcrum 6 to form lower jaw 7.

8 is the upper jaw, secured to frame 1.

9 is a gripping-lever fulcrumed at 10 and having secured in its upper end roller 11.

12 is an arm fulcrumed at 13 at the upper end of lever 5.

14 is a spring tending to force arm 12 downward against endless cable 15.

16 and 17 are rollers so adjusted as to lightly grip the return side of endless cable 15.

18 is a disengaging-rod extending rearwardly from block 19 and slidably supported by bearings 20.

21 is a rubber bumper secured in forward end of frame 1.

22 is a spring-stop.

23 is a dash-pot operating at the end of the return trip of the spreader.

24 represents pulleys over which passes the endless cable 15. 25 is a belt-wheel transmitting the driving power to said endless cable 15.

26 is the table on which the cloth is to be spread.

27 is the cloth.

28 represents guides on the side of the table to assist in keeping the edges of the cloth even and in the same line as it is being spread.

29 is a rod suspended across the table to keep the cloth off the table as it is being spread, thereby reducing the friction, and consequently the power necessary to draw the cloth over the underlying surface. The number of rods required for this purpose depends upon the length of the table.

The operation of our invention is as follows: The end of the cloth to be spread is placed between the jaws 7 and 8, the spreader being in the position shown in Fig. 1. The lower end of gripping-lever 9 is then pulled rearwardly, which forces the upper end with roller 11 against the endless cable 15, thus gripping the same between said roller and arm 12. Cable 15 thus gripped and at that point moving forward carries with it lever 9 and the upper end of lever 5, fulcrumed at 6, which action throws that part of lever 5 extending beyond said fulcrum or lower jaw 7 up and against upper jaw 8, thus gripping the cloth placed between the said jaws 7 and 8. The position now of the spreader and parts is shown in Figs. 3 and 6. The spreader in this position, carrying with it the cloth, moves forward until it comes in contact with spring-stop 22, which contact forces back disengaging-rod 18, which pushes back the upper end of gripping-lever 9, thus releasing endless cable 15 and allowing jaws 7 and 8 to open and drop the cloth. The track on which the spreader travels is slightly inclined, as shown in Fig. 6, with the lower end at the starting-point. This in itself might be sufficient for the return of the spreader by gravitation; but to aid this the spreader is provided with rollers 16 and 17, lightly gripping the return side of the endless cable, so that when gripping-lever 9 is forced back, releasing the grip carrying the spreader forward, said rollers 16 and 17, acted upon by the return side of said cable, together with the tendency of the inclined track, easily and quickly return the spreader to the starting-point, at which point is provided a dashpot for lightly stopping the return movement of the spreader. The spreader is now in position and ready to be started with another fold of cloth.

What we claim as our invention, and desire to secure by Letters Patent, is—

1. A cloth-spreading apparatus consisting of, a track upon which a spreader operates, a spreader operating on said track and having means for gripping cloth to be spread from a relatively stationary supply, means for gripping an operating-cable, and an operating-cable operating said spreader.

2. A cloth-spreading apparatus consisting of, a track upon which a spreader operates, a spreader operating on said track and having means for gripping cloth to be spread from a relatively stationary supply, means for gripping an operating-cable, an operating-cable operating said spreader, an operating-surface upon which cloth may be spread, and automatic means for disengaging said spreader from said operating-cable at a predetermined point.

3. A cloth-spreading apparatus consisting of, a track upon which a spreader operates, a spreader operating on said track and having means for gripping cloth to be spread from a relatively stationary supply, means for gripping an operating-cable, an operating-cable operating said spreader, an operating-surface upon which cloth may be spread, automatic means for disengaging said spreader from said operating-cable at a predetermined point, and automatic means for returning said spreader to initial position.

4. In a cloth-spreading machine, the combination of a table, an endless cable mounted on pulleys, said cable extending lengthwise of the table and having a portion of its length above the same, a cloth-gripper adapted to be attached to the said endless cable, a detaching device secured above one end of the table to detach the said gripper from the cable, and a track upon which said cloth-gripper may operate.

5. In a cloth-spreading apparatus the combination of an operating-surface upon which material may be spread, a cloth-spreader operating over said surface in a fixed path, a tractive force for operating said spreader back and forth automatically, and a stationary support for holding cloth to be spread.

6. In combination in a cloth-spreader and accompanying apparatus, frame 1, grooved wheels 2 journaled in said frame, wire cable 4 serving as a track for said wheels, endless cable 15, a tractive force applied to said cable, means for attaching material to said spreader, and means for connecting said spreader to said cable.

7. In combination in a cloth-spreader, frame 1, wheels 2 supporting said frame, jaw 8, jaw 7 operated by lever 5, lever 5, arm 12, and gripping-lever 9, all operating substantially as described.

WILLIAM OLIVER CRAIN.
GEORGE WILBUR GWINN.

Witnesses:
WILLIAM W. VARNEY,
S. GORDON HOPKINS.